United States Patent [19]

Hamer et al.

[11] Patent Number: 5,032,231
[45] Date of Patent: Jul. 16, 1991

[54] VACUUM DISTILLATION PROCESS

[75] Inventors: Johannes A. Hamer; Pieter Van Der Heijden, both of The Hague, Netherlands

[73] Assignee: Shell Oil Company, Houston, Tex.

[21] Appl. No.: 477,378

[22] Filed: Feb. 9, 1990

[30] Foreign Application Priority Data

Feb. 10, 1989 [GB] United Kingdom ............... 8903009

[51] Int. Cl.$^5$ .............................................. B01D 3/10
[52] U.S. Cl. .................................... 203/40; 203/93; 203/94; 203/98; 203/DIG. 9; 203/DIG. 25; 203/357; 203/366
[58] Field of Search .................... 203/40, 91, 90, 93, 203/94, 98, DIG. 9, DIG. 25; 202/197, 236; 159/48.2, DIG. 23, DIG. 16

[56] References Cited

U.S. PATENT DOCUMENTS

| | | |
|---|---|---|
| 2,664,391 | 12/1953 | Coulter ................................ 202/153 |
| 3,334,027 | 8/1967 | Goeldner .............................. 203/40 |
| 3,344,042 | 9/1967 | Hardesty .............................. 203/40 |
| 3,480,515 | 11/1969 | Goeldner .............................. 203/90 |
| 3,749,647 | 7/1973 | Micklewright ........................ 202/153 |
| 4,166,773 | 9/1979 | Higley et al. ........................ 203/DIG. 25 |
| 4,323,431 | 4/1982 | Takashashi et al. ............... 203/DIG. 25 |
| 4,409,064 | 10/1983 | Vora et al. ........................... 203/40 |
| 4,568,428 | 2/1986 | Rigg et al. ........................... 203/91 |
| 4,938,868 | 7/1990 | Nelson ................................. 203/DIG. 14 |

Primary Examiner—Virginia Manoharan

[57] ABSTRACT

In a vacuum distillation process a feed stream is supplied to a furnace and a heated feed stream containing vapor and liquid is passed from the furnace into a distillation column operating at a subatmospheric pressure. Vapor is allowed to rise inside the distillation column. The rising vapor is contacted with a de-entrainment means to remove entrained liquid from the rising vapor. Wash liquid is sprayed on the de-entrainment means and subsequently passed from the distillation column to a collection vessel. The wash liquid is cooled and then withdrawn from said collection vessel.

2 Claims, 1 Drawing Sheet

VACUUM DISTILLATION PROCESS

FIELD OF INVENTION

The present invention relates to a vacuum distillation process for distilling a feed containing hydrocarbons, which feed has a temperature in the range of from 380° to 425° C., at a subatmospheric pressure in the range of from 650 to 5,200 Pa. The feed is sometimes referred to as long residue.

Such a vacuum distillation process comprises supplying feed to a furnace, passing heated feed comprising vapor and liquid from the furnace into a distillation column operating at a subatmospheric pressure, allowing vapor to rise inside the distillation column, contacting the rising vapor with a de-entrainment device to remove entrained liquid from the rising vapor, spraying wash liquid on the de-entrainment device, passing wash liquid from the distillation column to a vessel, and withdrawing wash liquid from the vessel.

In the process the wash liquid is withdrawn from the vessel by means of a pump. It was found, however, that the temperature of the wash liquid was so high that cavitation occurred in the pump, which reduced the pump's life considerably.

It is an object of the present invention to provide a vacuum distillation process in which the chance of cavitation is reduced considerably.

To this end the vacuum distillation process according to the present invention comprises supplying feed to a furnace, passing heated feed comprising vapor and liquid from the furnace into a distillation column operating at a subatmospheric pressure, allowing vapor to rise inside the distillation column, contacting the rising vapor with a de-entrainment device to remove entrained liquid from the rising vapor, spraying was liquid on the de-entrainment device, passing wash liquid from the distillation column to a vessel, and withdrawing wash liquid from the vessel, wherein the wash liquid is cooled prior to being withdrawn from the vessel.

Cooling the wash liquid can be carried out by mixing the wash liquid with liquid having a lower temperature, wherein mixing can be done in the vessel or in the conduit connecting the distillation column and the vessel through which the wash liquid is passed to the vessel.

The cooling liquid can be part of the wash liquid which is from the vessel and cooled in a separate cooler. However, in order to save energy in cooling the wash liquid, wash liquid is cooled by mixing it with part of the feed withdrawn from the feed prior to preheating.

Thus in the process according to the present invention cooled wash liquid is present in the vessel. As a result thermal degradation of the wash liquid is suppressed.

DETAILED DESCRIPTION OF THE DRAWING

Figure 1:
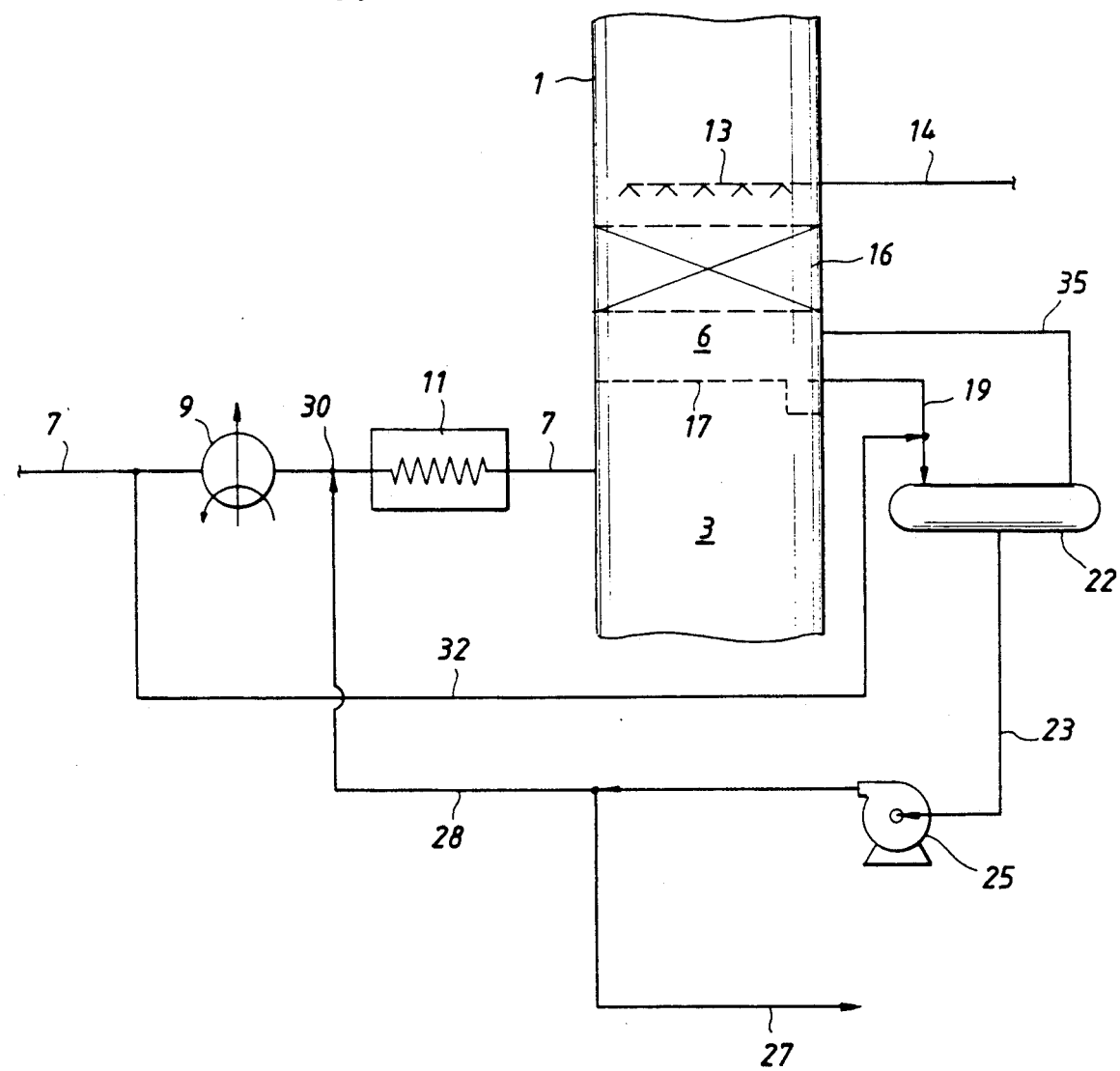
FIG. 1 shows a schematic process via a longitudinal section of a distillation column.

FIG. 1 shows a distillation column 1 having an inlet section 3. This column also includes a top section and a bottom section which are not shown in FIG. 1. Into the inlet section 3 debouches feed through supply conduit 7 which feed passes through preheater 9 and furnace 11.

The wash section 6 comprises a sprayer 13 provided with a wash liquid supply conduit 14, a de-entrainment device 16 and a draw-off tray 17. Removal conduit 19 connects the draw-off tray 17 to vessel 22. The de-entrainment device comprises trays, packing or other equipment suitable to remove liquid from a vapor.

During normal operation feed passing through supply conduit 7 is preheated in preheater 9 and further heated in furnace 11 to vaporize part of the feed. Heated feed comprising vapor and liquid is passed from the furnace 11 into the inlet section 3 of the distillation column 1. Distillation column 1 operates at a subatmospheric pressure.

Liquid drops downward and is collected in the bottom section (not shown) from which the liquid is removed. Vapor rises inside the distillation column 1 to the top section (not shown) from which the vapor is withdrawn by means of a vacuum pump such as a steam ejector.

The rising vapor passes through the wash section 6 and in the de-entrainment device 16 entrained liquid drops are separated from the rising vapor.

Wash liquid is sprayer 13 on the de-entrainment device 16 to remove entrained liquid droplets therefrom. Heavy components collected on the de-entrainment device 16 are washed away before substantial cracking of the heavy components can occur.

Wash liquid and removed liquid are collected on the draw-off tray 17 from which the wash liquid containing mixture is removed through removal conduit 19.

The wash liquid is stored in vessel 22 from which wash liquid is withdrawn through conduit 23 by means of pump 25. Withdrawn wash liquid can be pumped to a storage (not shown) through conduit 27 for further use. Alternatively to enhance the distillation recovery at least part of the withdrawn wash liquid can be supplied through conduit 28 to the feed in the feed supply conduit 7 at a joint 30 interconnecting feed supply conduit 7, at which the temperature the feed is about equal to the temperature of the withdrawn liquid after the last element of preheater 9.

Feed having a temperature which is lower than the temperature of the liquid entering into removal conduit 19 is supplied through conduit 32 to removal conduit 19 in which it is mixed with the wash liquid to cool it. Suitably the amount is between 0.10 and 1.25 kg per kg of wash liquid supplied to the vessel.

The amount of feed mixed with wash liquid is such that the temperature of the mixture is just below the temperature at which the liquid will cause cavitation in the pump 25.

To make the pressure in the vapor space of the vessel 22 substantially equal to the pressure in the distillation column 1, the vapor space is connected to the interior of the distillation column 1 by means of line 35.

What we claim as our invention is as follows:

1. A vacuum distillation process consisting essentially of supplying a feed stream to a furnace and heating said feed stream, in said furnace to produce a heated vapor-liquid stream, removing said heated vapor-liquid stream and passing it into a distillation column operating at subatmospheric pressure, separating said heated vapor-liquid stream in said column and allowing said vapor to rise in the column, contacting said rising vapor with a de-entrainment means to remove entrained liquid from said rising vapor, spraying wash liquid on the de-entrainment means to cause the removed liquid to become disentrained from said vapor and causing the resulting wash liquid to drop in said column, withdrawing the resulting wash liquid from said column to a liquid collection vessel, in which process the wash liquid is cooled prior to passage to the collection vessel by mixing the wash liquid with part of the feed stream wherein the amount of feed stream used to cool the wash liquid is between 0.10 and 1.25 kg per kg of said wash liquid supplied to the collection vessel, and after cooling, said wash liquid is removed from said collection vessel.

2. The vacuum distillation process as claimed in claim 1, further consisting essentially of supplying at least part of the wash liquid withdrawn from the collection vessel to the feed stream prior to passage to said furnace.

* * * * *